United States Patent [19]
Mukoh et al.

[11] 4,037,036
[45] July 19, 1977

[54] 9-(p-VINYLPHENYL)-ACRIDINE POLYMERS

[75] Inventors: Akio Mukoh; Yasuki Mori; Hirosada Morishita, all of Hitachi, Japan

[73] Assignee: Hitachi, Ltd., Japan

[21] Appl. No.: 580,316

[22] Filed: May 23, 1975

[30] Foreign Application Priority Data

May 24, 1974 United Kingdom .............. 49-57876
June 28, 1974 Japan ................................. 49-73375
July 10, 1974 Japan ................................. 49-78238

[51] Int. Cl.² ............................................. C08F 26/06
[52] U.S. Cl. ......................................... 526/46; 96/1.5; 204/159.22; 526/13; 526/17; 526/18; 526/47; 526/259

[58] Field of Search .................... 260/80.3 R, 85.5 R, 260/85.5 B, 85.7, 88.1 PA, 86.1 N, 88.3 R, 91.5; 526/13, 17, 18, 46, 47, 259

[56] References Cited

U.S. PATENT DOCUMENTS 3,583,869  6/1971  Tubuko et al. ................. 260/88.3 R
3,764,316  10/1973  Dailey et al. ................... 260/88.3 R

OTHER PUBLICATIONS

Hiroshi et al., Chem. Abs. 75 (1971) pp. 77312j.

Primary Examiner—Harry Wong, Jr.
Attorney, Agent, or Firm—Craig & Antonelli

[57] ABSTRACT

Homopolymers or copolymers of 9-(p-vinylphenyl)-acridine show excellent photoconductivity.

6 Claims, No Drawings

9-(P-VINYLPHENYL)-ACRIDINE POLYMERS

The present invention relates to homopolymers of 9-(p-vinylphenyl)acridine, which is a polycyclic aromatic vinyl monomer represented by the formula,

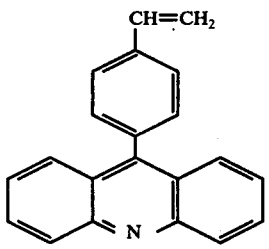

(I)

and copolymers thereof with other vinyl monomers which are useful as organic photoconductive materials.

As materials having photoconductivity, there have heretofore been proposed inorganic materials such as selenium, cadmium sulfide and zinc oxide, polycyclic aromatic compounds such as anthracene, pyrene, perylene and phenanthrene, low molecular weight heterocyclic compounds such as pyrazoline, oxazole and derivatives thereof, and organic polymers such as poly(N-vinylcarbazole), poly[9-(p-vinylphenyl)anthracene], poly(vinylanthracene) and poly(vinylacridine). One of the advantages to be expected for organic photoconductive materials which are generally inferior in photoconductivity to inorganic photoconductive materials is that the organic photoconductive materials can form films having excellent transparency. At present, organic photoconductive materials are still unsatisfactory in that they have high solubility in solvents, film-forming property and comparatively good photoconductivity simultaneously. Various efforts have heretofore been made to search after any novel compounds useful as organic photoconductive materials.

The present inventors found a novel compound, 9-(p-vinylphenyl)acridine, represented by the formula, on the basis of previous knowledge that polycyclic aromatic compounds had properties as organic semiconductors. However, it was impossible to use this compound along and the compound had to be used by dispersing it in a synthetic resin as a binder.

An object of the present invention is to provide a novel photoconductive homopolymer synthesized from a novel polycyclic aromatic compound 9-(p-vinylphenyl)acridine, which homopolymer has an improved filmforming property and photoconductivity.

Another object of the present invention is to provide a novel copolymer synthesized from the said novel polycyclic aromatic compound and a polymerizable vinyl monomer, which copolymer has an improved filmforming property and photoconductivity.

Still another object of the present invention is to provide a process for producing a polymer and copolymer from 9-(p-vinylphenyl)acridine.

These and other objects and advantages of the invention will appear from the following description of the invention.

9-(p-Vinylphenyl)acridine having a melting point of 78°–80° C which is used as a starting material in the present invention can be obtained by any one of the following three methods:

p-Halogenated styrene is reacted with 9-magnesium-halogenated acridine or 9-alkali metal-substituted acridine, as represented by the following reaction scheme (II) or (III):

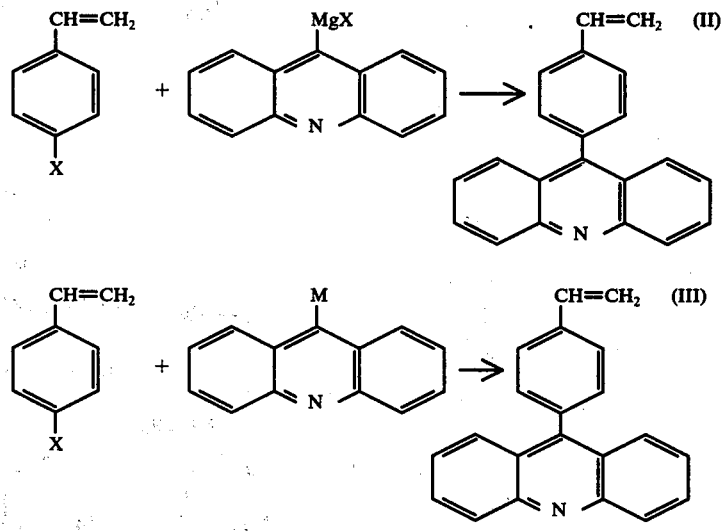

wherein X is chlorine, bromine or iodine, and M is lithium, sodium or potassium.

2. p-Alkali metal-substituted styrene is reacted with 9-halogenated acridine or acridone, as represented by the following reaction scheme (IV) or (V):

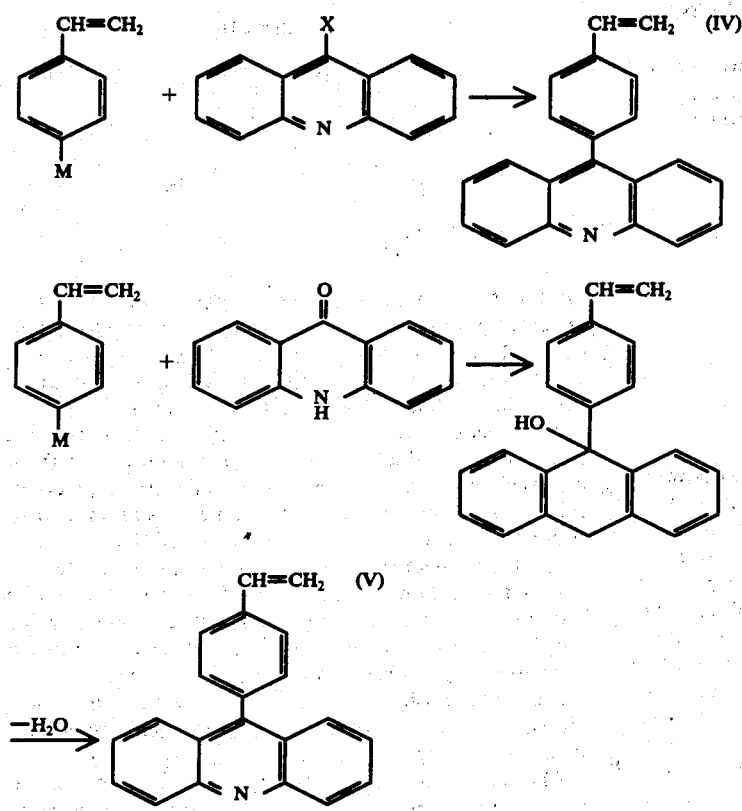
wherein X and M are as defined above.
3. p-Vinylphenylmagnesium halide is reacted with acridone or 9-halogenated acridine, as represented by the following reaction scheme (VI) or (VII):
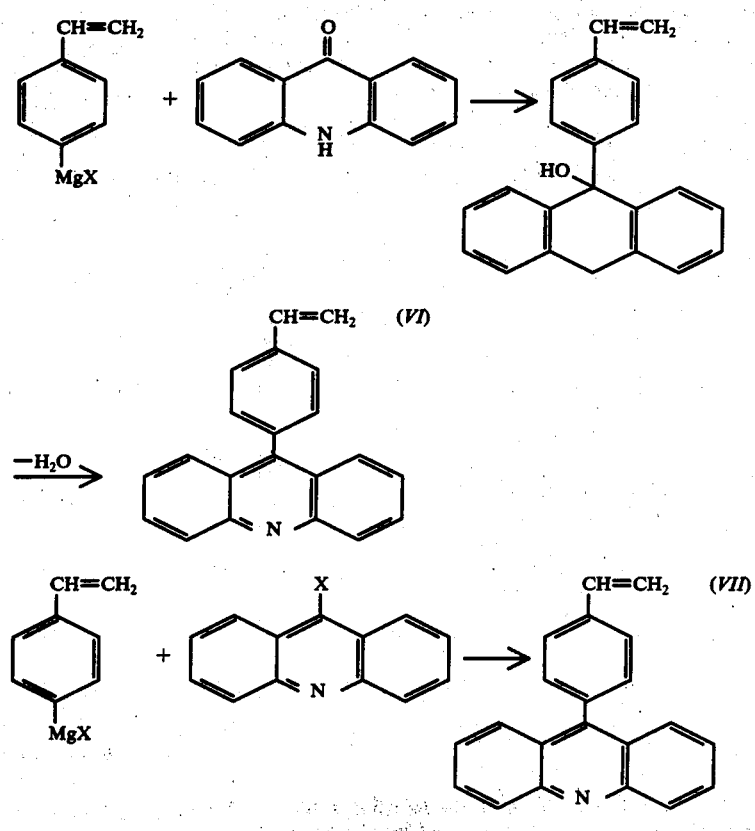

wherein X and M are as defined above.

According to the present invention, a polymer for use in a photoconductive material of 9-(p-vinylphenyl)acridine, that is, a homopolymer of 9-(p-vinylphenyl)acridine having recurring units in the molecule represented by the formula,

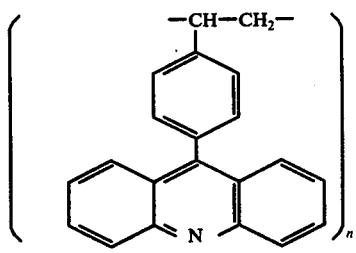

wherein $n$ is a degree of polymerization and is 50 to 2,000, or a copolymer of 9-(p-vinylphenyl)acridine and another polymerizable vinyl monomer, which copolymer containing recurring units in the molecule represented by the formula,

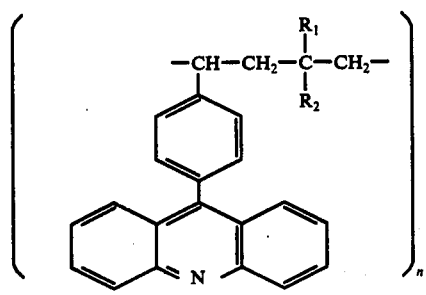

wherein $R_1$ is hydrogen or methyl, $R_2$ is

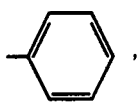

—$COOC_pH_{2p+1}$ (wherein $p$ is 1 to 18),

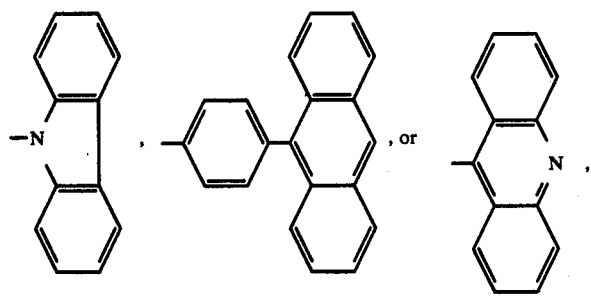

and $n$ is a degree of polymerization and is 25 to 2,000 is provided. Such 9-(p-vinylphenyl)acridine polymers are obtained by polymerizing 9-(p-vinylphenyl)acridine alone or together with another polymerizable vinyl monomer. The term "polymers" used herein include homopolymers and copolymers. These polymers can be obtained according to any of radical polymerization or ionic polymerization.

The radical polymerization is carried out, in general, in the presence of a free radical initiator. Typical examples of the free radical initiator are peroxides such as benzoyl peroxide, lauroyl peroxide and di-tert-butyl peroxide, azo compounds such as 2,2'-azobisisobutyronitrile, 2,2'-azobis-2-methylbutyronitrile and 1,1'-azobis-1-cyclohexanecarbonitrile, persulfates such as potassium persulfate and ammonium persulfate, and combinations of a peroxide and a reducing agent such as a combination of cumene hydroperoxide with a ferrous salt. These may be used either singly or in the form of a mixture of two or more. The polymerization reaction is effected at 60° to 200° C for 2 to 40 hours, whereby the desired product is obtained. According to the present inventors' experiments, however, it is advantageous from the viewpoint of yield to effect the polymerization reaction at a temperature of about 60° C or more. In addition thereto, the radical polymerization may be carried out according to thermal polymerization or radiation-induced polymerization (ultraviolet or gamma rays).

The ionic polymerization is carried out in the presence of an ionic catalyst, that is, a Ziegler type catalyst. As the Ziegler type catalysts, there may be shown, for example, catalyst systems composed of an alkylaluminum such as triethylaluminum, trimethylaluminum or diethylaluminum, or an alkylaluminum halide, and titanium trichloride, titanium tetrachloride or a vanadium chloride. The reaction is effected in a closed system at 30° to 150° C for 10 to 100 hours in the presence of one or more of the abovementioned catalysts, whereby the desired product can be obtained.

Alternatively, the polymerization may be carried out according to anionic polymerization using as a catalyst an organometallic compound such as naphthalene sodium or anthracene potassium, or according to cationic polymerization using as a catalyst an electron attractive compound such as boron trifluoride or aluminum chloride, etc.

Thus, the 9-(p-vinylphenyl)acridine is quite easily polymerizable, and hence can be copolymerized with other vinyl monomers such as, for example, styrene, acrylonitrile, acrylates, methacrylates, N-vinylcarbazole, 9-vinylanthracene, 9-vinylacridine, 9-(p-vinylphenyl)-anthracene and vinyl acetate.

It is practically desirable that such copolymers of 9-(p-vinylphenyl)acridine with another polymerizable vinyl monomer contain at least 50 mole % of 9-(p-vinylphenyl)acridine since their sensitivity is remarkably reduced if the 9-(p-vinylphenyl)acridine is less than 50 mole %. When one intends to produce a film having excellent mechanical properties, however, the 9-(p-vinylphenyl)acridine content is not particularly limited.

Alternatively, the 9-(p-vinylphenyl)acridine polymers of the present invention are produced by reacting a p-halogenated styrene polymer with a 9-alkali metal-substituted acridine or by reacting a p-alkali metal-substituted styrene polymer with a 9-halogenated acridine.

The term "p-halogenated styrene polymer" used herein means a polymer having in its molecular chain recurring units represented by the formula,

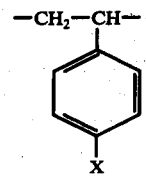

wherein X is chlorine, bromine or iodine. The polymer can be produced by homopolymerization of styrene substituted by chlorine, bromine or iodine at its para-position or copolymerization of such a styrene with another vinyl monomer. The p-halogenated styrene polymer can also be produced by chlorination, bromination or iodination of a styrene polymer. Among these p-halogenated styrene polymers, p-iodostyrene is most preferable and p-bromostyrene ranks next thereto.

The term "p-alkali metal-substituted styrene polymer" used herein means a polymer having in its molecular chain recurring units represented by the formula,

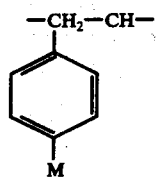

wherein M is lithium, sodium or potassium. The polymer can be produced by reacting a p-halogenated styrene monomer with a corresponding organic alkali metal compound such as, for example, ethyl lithium, butyl lithium, pentyl sodium or pentyl potassium. Among the p-alkali metal-substituted styrene polymers, p-lithium-substituted styrene monomer is most preferable owing to its moderate reactivity.

Also, the term "9-halogenated acridine" used herein means an acridine derivative having chlorine, bromine or iodine as a substituent at its 9-position. Although any of such 9-halogenated acridines can be used substantially without difficulty, 9-iodoacridine is most preferable owing to its reactivity and 9-bromoacridine ranks next thereto.

Also, the term "9-alkali metal-substituted acridine" used herein means an acridine derivative having lithium, sodium or potassium as a substitutent at its 9-position. The 9-alkali metal-substituted acridine can be obtained by reacting a 9-halogenated acridine with the corresponding organic alkali metal compound such as, for example, ethyl lithium, butyl lithium or pentyl sodium. Among the 9-alkali metal-substituted acridines, 9-lithium-substituted acridine is preferable owing to its reactivity.

In the practice of the present invention, a solvent such as, for example, a hydrocarbon such as cyclohexane or benzene, a halogenated hydrocarbon such as dichloroethane, dichloromethane or chloroform, or an ether such as tetrahydrofuran, dioxane or anisole is used.

The following Referential Examples 1-6 illustrate the preparation of the 9-(p-vinylphenyl)acridine in more detail.

REFERENTIAL EXAMPLE 1

Into a four-neck flask equipped with a stirrer, a reflux condenser with a calcium chloride tube, a dropping funnel with a calcium chloride tube and a nitrogen gas inlet tube, 3.4 g of magnesium cut powder and 20 ml of tetrahydrofuran were charged, and 500 ml of a solution of 57.9 g of 9-bromoacridine in tetrahydrofuran was added dropwise with slow stirring and refluxing in a dry nitrogen gas stream. When the magnesium had been consumed, 20 ml of a solution of 25.6 g of p-bromostyrene in tetrahydrofuran was added dropwise and the mixture was refluxed for further five hours. The contents of the flask were then allowed to cool and poured onto hydrochloric acid-ice to effect hydrolysis. The organic layer was extracted with ether. The extract was dried over anhydrous sodium sulfate and the solvent was then distilled off. The residue was purified by alumina column chromatography to obtain 17.1 g of yellow crystals of 9-(p-vinylphenyl)acridine (m.p. 78°-80° C). Yield 27.0%, nitrogen content 5.3%.

Its infrared absorption spectrum showed similar absorptions at 909 cm$^{-1}$ and 990 cm$^{-1}$ to those of double bond appearing in the spectrum of styrene.

REFERENTIAL EXAMPLE 2

A solution of butyl lithium in ether was obtained by reacting a solution consisting of 137 g of butyl bromide and 200 ml of ether with a suspension consisting of 17 g of lithium and 400 ml of ether by the use of the same apparatus as that used in Referential Example 1. This solution was added dropwise to 300 ml of an ether solution containing 180 g of 9-bromoacridine at 0°-5° C, and the mixture was then warmed gradually to room temperature and stirred for further 3 hours. To the mixture was added dropwise 322 g of p-iodostyrene diluted with 300 ml of ether in the presence of cobalt chloride with stirring in a nitrogen gas stream, and the mixture was then refluxed for 5 hours. The reaction mixture was poured onto hydrochloric acid-ice and stirred. The organic layer was extracted with ether, and the extract was dried over anhydrous sodium sulfate. The solvent was then distilled off to obtain yellowish white crystals. The crystals were purified by alumina column chromatography to obtain 75.6 g of 9-(p-vinylphenyl)acridine, yield 38.4%.

Its nitrogen content was 5.3% and its infrared absorption spectrum was in accord with that of the product of Referential Example 1.

REFERENTIAL EXAMPLE 3

Into a four-neck flask equipped with a stirrer, a nitrogen gas inlet tube, a dropping funnel and a reflux condenser, 5.8 g (0.025 mole) of p-iodostyrene and 100 ml of anhydrous ether were charged, and 53 ml (0.05 mole) of a butyl lithium ether solution was added dropwise with stirring at −15 to −20° C in a dry nitrogen gas stream. After 15 minutes, 50 ml of a solution of 6.5 g (0.025 mole) of 9-bromoacridine in benzene was added dropwise. Cooling was stopped and the mixture was then gradually warmed to room temperature. After stirring for 5 hours, the mixture was poured onto dilute hydrochloric acid-ice. Ether was added and the organic layer was recovered. After washing with water and dehydration, ether was distilled off. The residue was purified by alumina column chromatography to obtain 3.5 g of yellowish white crystals. Nitrogen content 4.9%, melting point 78°-80° C.

In its infrared absorption spectrum, similar absorptions to those of styrene attributed to double bond were observed at 909 cm$^{-1}$ and 990 cm$^{-1}$.

REFERENTIAL EXAMPLE 4

To 200 ml of a solution of 14.7 g (0.08 mole) of p-bromostyrene in ether was added dropwise 110 ml (0.12 mole) of a butyl lithium ether solution at −15 to −20° C by the use of the same apparatus as that used in Referential Example 3. After 10 minutes, 60 ml of an ether solution containing 15.6 g (0.08 mole) of acridone was added dropwise. Cooling was stopped and the mixture was then gradually warmed to room temperature. After stirring at room temperature for 5 hours, the reaction mixture was treated in the same manner as in Referential Example 3 to obtain 10.2 g of yellowish white crystals. Their analytical results were in accord with those of the product of Referential Example 3.

REFERENTIAL EXAMPLE 5

Into a four-neck flask equipped with a stirrer, a nitrogen gas inlet tube, a reflux condenser with a calcium chloride tube and a dropping funnel were charged 4.9 g of magnesium cut powder and 50 ml of tetrahydrofuran. 36.6 Grams of p-bromostyrene diluted with tetrahydrofuran to about 4 times the weight was added dropwise under gentle reflux in a dry nitrogen gas stream. After the magnesium had disappeared, a solution consisting of 37.0 g of acridone and 600 ml of tetrahydrofuran was added dropwise over a period of two hours with stirring. After refluxing for further 5 hours, the reaction mixture was allowed to cool and then poured onto hydrochloric acid-ice to effect hydrolysis. The organic layer was extracted with ether and the extract was dried over anhydrous sodium sulfate. The solvent was then distilled off to obtain a yellow semi-solid. Almost the same weight (60 g) of phosphorus pentoxide was added to 500 ml of a solution of the semi-solid in benzene. The mixture was stirred at room temperature for 5 hours and then allowed to stand overnight. The supernatant liquid separated by decantation was washed with water, dried, and then concentrated to dryness. The residue was purified by silica gel chromatography to obtain 22.5 g of 9-(p-vinylphenyl)acridine. Yield 42.1%.

Its infrared absorption spectrum showed absorptions similar to those of double bond appearing in the spectrum of styrene at 909 cm$^{-1}$ and 990 cm$^{-1}$.

REFERENTIAL EXAMPLE 6

Grignard's reagent of p-bromostyrene was prepared in the same manner as in Referential Example 5. 0.5 Mole % of cobalt chloride as a catalyst was added thereto. A liquid consisting of 40.4 g of 9-chloroacridine and 80 ml of tetrahydrofuran was slowly added dropwise at 35°–40° C with stirring in a dry nitrogen gas stream. Refluxing was carried out for 3 hours. The reaction mixture was then allowed to cool and poured onto hydrochloric acid-ice. The organic layer was extracted with ether, washed with water, and dried over anhydrous sodium sulfate. The solvent was then distilled off to obtain yellowish white crystals. The crystals were purified by alumina column chromatography to obtain 22.3 g of 9-(p-vinylphenyl)acridine. Yield 42.0%. Its analytical results were in accord with those as shown in Referential Example 5.

The following examples illustrate the present invention in more detail.

EXAMPLE 1

Into a polymerization tube was charged 0.5 g of 9-(p-vinylphenyl)acridine, and 0.2 ml of xylene containing 3 mg of di-tert-butyl peroxide as a radical polymerization initiator dissolved therein was added. The inside of the tube was replaced by nitrogen gas and then evacuated. The tube was sealed and heated at 130° C for 12 hours.

The resulting polymer was dissolved in 30 ml of tetrahydrofuran, re-precipitated by the addition of ethanol, filtered, and dried in vacuo. The product was dissolved in tetrahydrofuran, re-precipitated with ethanol, filtered, and dried in vacuo to obtain a homopolymer in the form of yellow powder. The homopolymer showed a molecular weight of 64,000 and a decomposition temperature of <300° C.

In this case, the conversion was 83.6% and higher than a conversion of 10% obtained in case of the polymerization of 9-vinylacridine, wherein vinyl group is directly bonded to acridine, under the same conditions. It shows that the 9-(p-vinylphenyl)acridine of the present invention, wherein vinyl group is bonded to acridine through phenylene ring, is very easy to polymerize.

EXAMPLE 2

2 Grams of 9-(p-vinylphenyl)acridine and 1.0 g of isobutyl methacrylate were dissolved in 50 ml of xylene, and 2.6 mg of 1,1'-azobis-1-cyclohexanecarbonitrile was added thereto. Polymerization was carried out by heating the mixture in a nitrogen gas stream at 40° C for 4 hours and then at 130° C for 10 hours. Ethanol was added to the polymerization product to obtain light yellow precipitate. It was filtered, dried, and then purified by dissolution in chlorobenzene and re-precipitation with ethanol. Thus, a copolymer in the form of yellow powder was obtained in a yield of 90.4%. The copolymer had a molecular weight of 71,500 and a decomposition temperature of 300° C.

EXAMPLE 3

Into a polymerization tube were charged 5.0 g of 9-(p-vinylphenyl)acridine and 2.0 g of N-vinylcarbazole. The inside of the tube was evacuated and replaced by nitrogen gas. 2 Milliliters of a xylene solution containing 5 mg of dicumyl peroxide was added thereto. The tube was again evacuated at liquid nitrogen temperature and melt-fused. The inside of the tube was heated at 130° C for 12 hours. The polymerization tube was opened and 100 ml of tetrahydrofuran was added to dissolve the polymerization product. The solution was poured into 1 l of methanol. The resulting precipitate was filtered to remove the unreacted monomer, and was then dried. It was purified by dissolving again in benzene and re-precipitating with methanol. Thus, a light yellow copolymer, which was soluble in benzene, toluene, dichloromethane, dichloroethane, dioxane, tetrahydrofuran, etc. or a mixture thereof, was almost quantitatively obtained. The copolymer had a molecular weight of 51,600 and a decomposition temperature of >300° C.

Also, the infrared absorption spectrum of the copolymer showed absorptions due to perpendicular vibration of carbazole nucleus at 720 cm$^{-1}$ and 748 cm$^{-1}$. It means the presence of carbazole nucleus.

EXAMPLE 4

A solution of 10 g of 9-(p-vinylphenyl)-acridine was mixed in a polymerization tube, which had been replaced by nitrogen gas and then melt-fused under reduced pressure, with a complex consisting of 2.0 ml of triethylaluminum and 110 mg of titanium trichloride, which had been aged in n-hexane at 60° C for 1 hour, as a catalyst. The mixture was then reacted at 80° C for 45 hours. 50 Milliliters of benzene and 50 ml of n-propanol were added and the mixture was refluxed for one hour. Thereto were added 100 ml of methanol and 100 ml of 1N-hydrochloric acid and refluxing was continued for further 2 hours. The lower layer of the liquid was removed and 100 ml of methanol and 100 ml of 1N-hydrochloric acid were added again. The mixture was refluxed for 2 hours and the lower layer was removed. The solvent-insoluble polymerization product was filtered, washed with benzene thoroughly, concentrated to a suitable amount, and poured into methanol. Thus, a solvent-soluble light yellow polymer was obtained. An operation of dissolving the polymer in benzene and then precipitating with ethanol was twice repeated. This purification gave the desired 9-(p-vinylphenyl)-acridine homopolymer in a yield of 38%. The homopolymer had a molecular weight of 15,500 and a decomposition temperature of > 300° C.

EXAMPLE 5

Into a polymerization tube which had been kept in a slightly pressurized state with dry nitrogen gas were charged 2.8 g of 9-(p-vinylphenyl)acridine and 5 ml of dry tetrahydrofuran, and the mixture was cooled to about −70° C with dry ice-acetone. Thereto was added 5 mg of sodium naphthalene and the whole was stirred at −70 to −60° C for 10 minutes. Then, the mixture was warmed to room temperature. After 3 hours, a small amount of methanol was added. The precipitated polymer was removed, washed with methanol repeatedly, and dried. Thus, a yellow polymer of 9-(p-vinylphenyl)acridine was obtained in a yield of 58%. The polymer had a molecular weight of 23,000 and a decomposition temperature of > 300° C.

EXAMPLE 6

Into a dry polymerization tube were charged 7.3 g of 9-(p-vinylphenyl)acridine and 15 ml of methylene chloride, and 0.03 ml of a solution of boron trifluoride in ether was then added at room temperature with stirring. After polymerization at 25° C for 4 hours, 0.3 ml of a concentrated aqueous ammonia solution was added to neutralize the catalyst. Further, methanol was added and the precipitated polymer was filtered. Thus, a light yellow 9-(p-vinylphenyl)acridine polymer was obtained in a yield of 68%. The polymer had a molecular weight of 9,800 and a decomposition temperature of 280°–290° C.

EXAMPLE 7

Into a flask equipped with a nitrogen gas inlet tube, a stirrer and a reflux condenser were charged 6.7 g (0.026 mole) of 9-bromoacridine and 20 ml of benzene. Thereto was added dropwise 50 ml (0.058 mole) of a butyl lithium solution as prepared according to the method described in J. Org. Chem. Vol. 24, page 2036 (1959), with stirring in a dry nitrogen gas stream. Stirring was continued for further 2 hours, and 400 ml of a benzene solution containing 4.50 g (iodinated styrene unit 0.020 mole) of polystyrene iodinated with iodine and iodic acid according to the method as described in Macromol. Chem., Vol. 30, page 85 (1959) was then added dropwise in about 2 hours. The reaction mixture was stirred at 55° to 60° C for 2 hours to effect the reaction. A small amount of dilute hydrochloric acid was added and the mixture was then stirred. The contents of the flask were poured into a large amount of methanol. The solidified polymer was lightly dried and then purified by repeating twice the operation of dissolving in tetrahydrofuran and then reprecipitating with methanol. Thus, 4.9 g of a yellowish polymer was obtained. Nitrogen content 3.9%. The polymer had a molecular weight of 100,200 and a decomposition temperature of > 300° C.

EXAMPLE 8

A solution of 9-lithium-substituted acridine in benzene was prepared from butyl lithium and 9-chloroacridine in the same manner as in Example 7. 400 Milliliters of a benzene solution containing 4.2 g (0.023 mole) of poly(p-bromostyrene) obtained by polymerization at 70° C using 1% of azoisobutyronitrile as an initiator was added dropwise to the above-mentioned solution of 9-lithium-substituted acridine (0.032 mole) in benzene at room temperature to effect the reaction. The polymer solidified with methanol was purified by dissolving in 1,2-dichloroethane and re-precipitating with methanol. Thus, 3.7 g of a yellow polymer was obtained. Nitrogen content 4.1%. The polymer had a molecular weight of 264,000 and a decomposition temperature of > 300° C.

EXAMPLE 9

To 110 ml (0.11 mole) of a solution of butyl lithium in benzene was added dropwise 900 ml of the same solution of 9.1 g (0.05 mole) of poly(p-bromostyrene) in benzene as that used in Example 8 over a period of about 3.5 hours with stirring in a dry nitrogen gas stream. After stirring for further one hour, a solution of 12.9 g (0.05 mole) of 9-bromoacridine in 30 ml of tetrahydrofuran was added. The mixture was stirred at room temperature for 3 hours and at 50°–60° C for one hour. The polymer was precipitated with methanol. The polymer thus obtained was purified by the use of tetrahydrofuran and methanol. Yield 11 g. Nitrogen content 4.5%. The polymer had a molecular weight of 187,000 and a decomposition temperature of >300° C.

The polymers obtained in the above-mentioned Examples 1 to 9 were confirmed to be polymers from the fact that characteristic absorptions due to vinyl group at 906 cm$^{-1}$, 995 cm$^{-1}$ and 1395 cm$^{-1}$ which were found in the infrared absorption of the monomer had disappeared in the spectra of the polymers. Also, the number-average molecular weight of the 9-(p-vinylphenyl)-acridine polymers was 2,000 to 500,000 depending upon the polymerization conditions. In general, the 9-(p-vinylphenyl)acridine polymers having a molecular weight of 5,000 to 200,000 are used. If their molecular weight is lower than 5,000, it is difficult to obtain a good film therefrom although their sensitivity is not reduced. Also, high degree of polymerization technique is required to obtain the polymers having a molecular weight of more than 200,000. Further, their decomposition temperature was 190° to 450° C. The polymers were easier to form a film as compared with a 9-vinylacridine polymers, and were applicable to electrophotography sensitive materials and microfilms as an organic semiconductor.

Thus, a film having excellent transparency can be produced from such polymers by dissolving them in a solvent of benzene series, or a cyclic ether such as tetrahydrofuran or dioxane, or a halogenated hydrocarbon such as dichloromethane or dichloroethane, or a mixture thereof.

This film can be used as a photoconductive material for electrophotography by forming it on a support such as a metal plate such as an aluminum plate, or an insulating plate or film equipped with a conductive layer such as a NESA film. Also, the film can be applied to a hologram material, microfilm, etc. in combination with a thermoplastic resin.

In order to improve the properties of the 9-(p-vinylphenyl)acridine polymer film, a plasticizer and a binder can be added to the film in the present invention if desired.

As the plasticizer, a terphenyl, chlorinated polyphenyl, dioctyl phthalate, dioctyl adipate, an ester resin, etc. may be used. Also, as the binder, a phenol resin, a vinyl chloride polymer, polyvinyl acetate, polystyrene, a polyacrylate, a polycarbonate, a silicone resin, a butyral resin, etc. may be used.

It is desirable to add a sensitizer in order to enhance the photoconductivity of 9-(p-vinylphenyl)-acridine polymer. For example, it is suitable to add as a chemical sensitizer 1 to 150% by weight of nitroanthraquinone, chloranil, tetracyanoethylene, tetracyanoquinodimethane, phthalic anhydride, trichloroacetic acid, 2,4,7-trinitrofluorenone, 2,4,5, 7-tetranitrofluorenone or a Lewis acid generally used, or to add 0.05 to 5% by weight of a dye sensitizer such as Crystal Violet, Malachite Green, Auramine, Rhodamine B, Nile Blue, a triarylcarbonium salt, a benzopyridinium salt.

The following application examples illustrate the application of the organic photoconductive materials of the present invention.

APPLICATION EXAMPLE 1

2 Grams of 9-(p-vinylphenyl)acridine polymer (molecular weight 132,000, decomposition temperature > 300° C) and 1 g of 2,4,7-trinitrofluorenone were added to 20 ml of a 1:2 (v/v) mixture of tetrahydrofuran and xylene. The mixture was flow-coated on an aluminum plate and then dried at 80° C for 4 hours to form a film of 4 μ in thickness. The film thus formed was charged by application of 6 kv-corona discharge and exposed for one second through a positive original to a 100 lux-light. Subsequently, a developing toner (Conifax PP Toner manufactured by Konishiroku Photo Industry Co., Ltd.) was sprinkled over the exposed film to obtain an image faithful to the original.

APPLICATION EXAMPLE 2

5 Grams of 9-(p-vinylphenyl)acridine polymer (molecular weight 9,800, decomposition temperature 280°–290° C) was dispersed in 100 ml of a toluene solution containing 1 g of m-terphenyl, 0.5 g of nitroanthraquinone and 25 mg of Malachite Green. This dispersion was treated in the same manner as in Application Example 1 to form a film. The film thus formed was charged according to an ordinary procedure and then exposed for 5 seconds through a positive original to a 30 lux-light. Subsequently, a developing toner was sprinkled over the exposed film to obtain an image faithful to the original, which image was then fixed by heating at 150° C for 3 seconds.

APPLICATION EXAMPLE 3

1 Gram of 9-(p-vinylphenyl)acridine polymer (molecular weight 48,300, decomposition temperature > 300° C), 0.4 g of m-terphenyl and 0.1 g of tetracyanoquinodimethane were dissolved in benzene. The resulting solution was coated on an aluminum plate in the same manner as in Application Example 1 to form a transparent film of 3 μ in thickness. The film thus formed was charged according to an ordinary procedure, and then exposed for 2 seconds through a positive original to a 70 lux-light. A developing toner was then sprinkled over the exposed film to obtain an image faithful to the original, which image was then fixed by heating at 140° C for 2 seconds.

APPLICATION EXAMPLE 4

1 Gram of 9-(p-vinylphenyl)acridine polymer (molecular weight 64,000, decomposition temperature >300° C), 0.5 g of m-terphenyl, 1 mg of Crystal Violet and 100 mg of tetracyanoethylene were dissolved in tetrahydrofuran. The resulting solution was coated on a glass plate having a NESA film to form a photosensitive layer of 3 μ in thickness. The layer thus formed was charged according to an ordinary procedure, and then exposed for 3 seconds through a positive original to a 50 lux-light. Subsequently, a developing toner was sprinkled over the exposed layer to obtain an image faithful to the original.

APPLICATION EXAMPLE 5

5 Grams of a copolymer (decomposition temperature > 300° C) obtained from 3 moles of 9-(p-vinylphenyl)acridine and 2 moles of 9-(p-vinylphenyl)-anthracene and 1.5 g of 2,4,5,7-tetrafluorenone were dissolved in 50 ml of benzene, and 1 g of chlorodiphenyl was added. The whole was well mixed. The resulting solution was roll-coated on a copper plate and dried to form a film of 2.5 μ in thickness. The film thus formed was charged according to an ordinary procedure, and then exposed for 1 second through a positive original to a 100 lux-light. Subsequently, a developing toner was sprinkled over the exposed film to obtain an image faithful to the original, which image was then fixed by heating at 150° C for 2 seconds.

APPLICATION EXAMPLE 6

5 Grams of a copolymer (decomposition temperature >300° C) obtained from 1 mole of 9-(p-vinylphenyl)acridine and 2 moles of N-vinylcarbazole and 1 g of 2,4,7-trinitrofluorenone were dissolved in 50 ml of a 1:1 (v/v) mixture of dichloroethane and xylene, and 1 g of m-terphenyl and 0.05 g of Crystal Violet were added. The whole was well mixed. The resulting solution was roll-coated on a copper plate and dried to form a film of 4 μ in thickness. The film thus formed was charged according to an ordinary procedure, and then exposed for 3 seconds through a positive original to a 30 lux-light. Subsequently, a developing toner was sprinkled over the exposed film to obtain an image faithful to the original, which image was then fixed by heating at 150° C for 2 seconds.

APPLICATION EXAMPLE 7

A mixture of 10 g of 9-(p-vinylphenyl)acridine polymer (molecular weight 96,500), 4 g of 2,4,7-trinitrofluorenone and 3 g of m-terphenyl were refluxed in 20 ml of a 1:1 (v/v) mixture of xylene and dichloroethane for 4 hours. The mixture was coated on an aluminum plate. The attenuation characteristic of the surface potential of this photosensitive film was compared with the attenuation characteristic of the surface potential of a photosensitive film prepared from 9-(p-vinylphenyl)anthracene polymer having a similar structure. The results obtained are shown in Table 1.

Table 1

| | Original charged potential $V_O$ (V) | Potential after standing at dark place for 10 seconds $V_{10}/V_0$ (%) | Sensitivity (lx.s) $E_{50}$ | $E_{10}$ |
|---|---|---|---|---|
| The present invention 9-(p-Vinyl-phenyl)-anthracene | 560 | 76 | 5 | 60 |
| polymer | 650 | 78 | 7.2 | >500 |

$ED_{50}$: Exposure required to attenuate $V_{10}$ to 50% of the original value
$ED_{10}$: Exposure required to attenuate $V_{10}$ to 10% of the original value As is clear from Table 1, the organic photoconductive material of the present invention has good sensitivity. Particularly, they show a smaller $E_{10}$ value and a remarkably smaller residual potential than the organic photoconductive material of prior art.

What is claimed is:

1. A homopolymer for use in a photoconductive material of 9-(p-vinylphenyl)acridine.

2. The polymer of claim 1, wherein said homopolymer has a molecular weight of 5,000 to 200,000.

3. A copolymer for use in a photoconductive material consisting of a polymer produced by copolymerizing at least 50 mole % of 9-(p-vinylphenyl)acridine and at least one monomer selected from the group consisting of styrene, acrylonitrile, an acrylate, a methacrylate, N-vinylcarbazole, 9-vinylanthracene, 9-vinylacridine, 9-(p-vinylphenyl)-anthracene and vinylacetate.

4. The polymer of claim 3, wherein said copolymer has a molecular weight of 5,000 to 200,000.

5. A process for producing a polymer of 9-(p-vinylphenyl)acridine which comprises heating 9-(p-vinylphenyl)acridine alone or together with another polymerizable vinyl monomer selected from the group consisting of styrene, acrylonitrile, an acrylate, a methacrylate, N-vinylcarbazole, 9-vinylanthracene, 9-vinylacridine, 9-(p-vinylphenyl)-anthracene and vinylacetate in the presence of a free radical initiator or an ionic catalyst.

6. A process for producing a polymer of 9-(p-vinylphenyl)acridine which comprises reacting a p-halogenated styrene polymer with a 9-alkali metal-substituted acridine or reacting a p-alkali metal-substituted styrene polymer with a p-halogenated acridine.

* * * * *

UNITED STATES PATENT OFFICE
CERTIFICATE OF CORRECTION

Patent No. 4,037,036  Dated July 19, 1977

Inventor(s) Akio MUKOH et al.

It is certified that error appears in the above-identified patent and that said Letters Patent are hereby corrected as shown below:

Item [30] should read:

FOREIGN APPLICATION PRIORITY DATA

--- May 24, 1974  Japan ................ 49-57876 ---

June 28, 1974  Japan ................ 49-73375

July 10, 1974  Japan ................ 49-78238

Signed and Sealed this

Eighth Day of November 1977

[SEAL]

Attest:

RUTH C. MASON  
Attesting Officer

LUTRELLE F. PARKER  
Acting Commissioner of Patents and Trademarks